June 14, 1949.  I. MENDELSOHN  2,473,107
DUAL REEL WIRE CONNECTOR FOR IRONING BOARDS
Filed Nov. 15, 1946
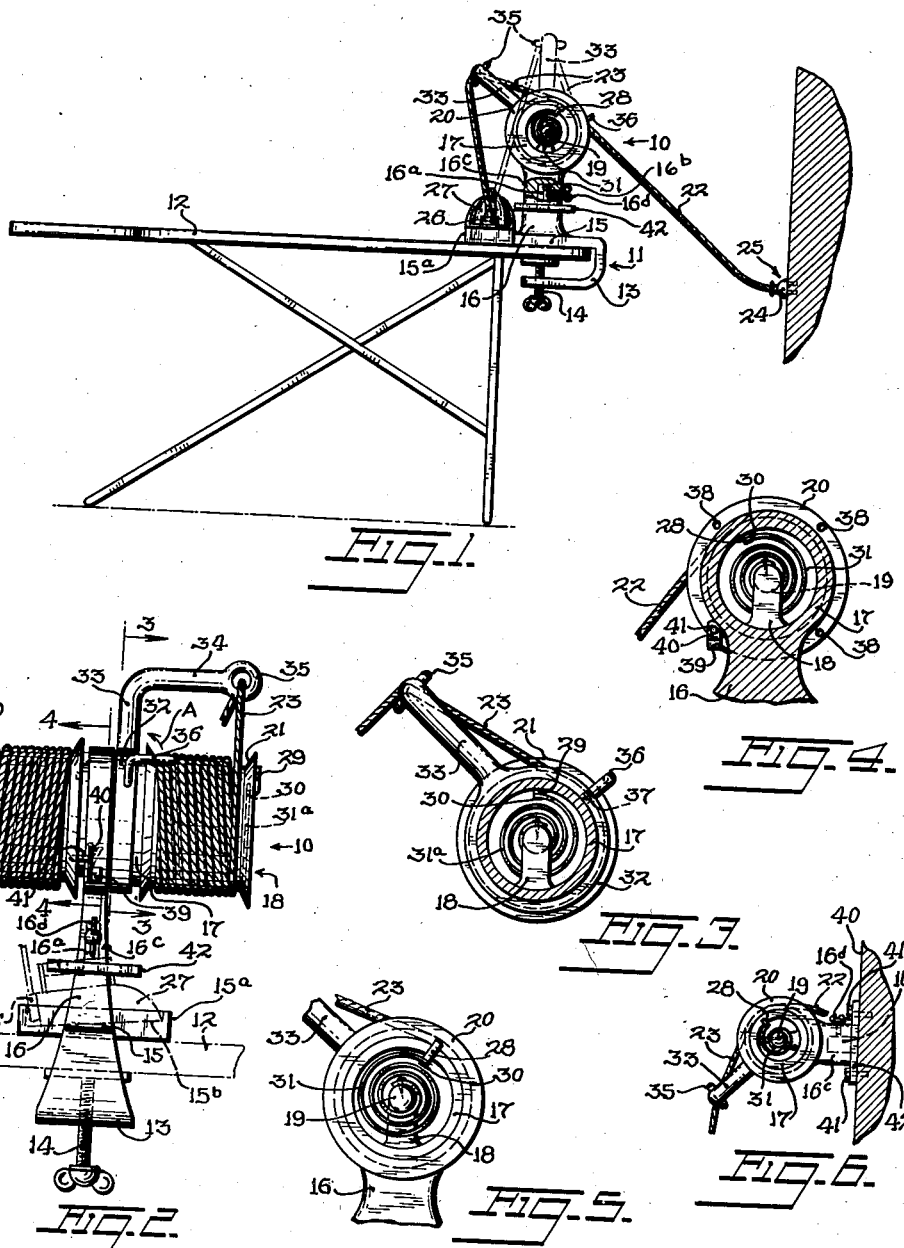
INVENTOR.
IRVING MENDELSOHN
BY
ATTORNEY Patented June 14, 1949

2,473,107

UNITED STATES PATENT OFFICE 2,473,107

DUAL REEL WIRE CONNECTOR FOR IRONING BOARDS

Irving Mendelsohn, Brooklyn, N. Y.

Application November 15, 1946, Serial No. 709,965

6 Claims. (Cl. 242—107)

The present invention concerns a dual reel wire connector for ironing boards and relates more specifically to a device comprising two electric cords wound on separate reels, one cord comprising a plug adapted to engage a wall socket connected to a source of electric energy, and the other cord comprising a plug adapted to engage an electric smoothing iron.

An object of the present invention is to provide improved means for reeling or spooling up the electrically interconnected cords extending from a point near one end of the ironing board to the wall socket and to the smoothing iron.

A further object is the provision of adjustable means connected to the support of the reel for supporting the cord extending to the smoothing iron.

Still another object is the provision of means for fixing against rotation, the reel carrying the cord extending to the wall socket.

Still another object is that the reel assembly shall be detachable from the ironing board, so as to be storable separately therefrom.

In accomplishing the objects of the present invention, a detachable reel support is provided with means for engaging the ironing board, said means being substantially in the form of a C-clamp. Extending upward from the upper arm of the C-clamp, as it engages the board is a standard supporting a cross bar and this cross bar extends to both sides of the standard to constitute together with the standard a substantially T-shaped member.

The cross bar of the T is substantially cylindrical and preferably hollow and a substantially cylindrical spool is revolubly mounted on each arm thereof. Within each hollow arm is mounted a coil spring which is connected to the spool mounted outside the arm, so that revolution of the spool loads the spring which will return the spool to its original position as soon as permitted. The spool containing the cord leading to the wall socket is formed on its inner end surface with angularly spaced longitudinally extending cylindrical recesses which are engageable by a pin mounted on a leaf spring mounted on the standard, so that this spool is fixable against rotation.

A guide arm is mounted by means of a cylindrical collar on the arm of the T supporting the cord extending to the smoothing iron and this collar is revoluble on said arm through a complete circle and lockable in any position of such revolution by a handle threaded radially into the collar and engaging the arm. The guide arm extends radially from the collar for some distance and thence parallel to the arm of the T and terminates in a loop through which the core extends from its spool to the smoothing iron.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side elevation of the ironing board showing my device in operative relation thereto, with one cord extending through the guide arm loop to the smoothing iron and the other cord extending to a wall socket, my invention being shown in end elevation therein.

Fig. 2 is an enlarged side elevational view of the device embodying my invention.

Fig. 3 is a sectional view on the line 3—3 of Fig. 2.

Fig. 4 is a sectional view on the line 4—4 of Fig. 2.

Fig. 5 is an enlarged view of a fragment of Fig. 1.

Fig. 6 is a side elevational view of the device showing it attached to a wall.

Referring now in detail to the drawings, my improved reel 10 comprises the clamp portion 11 which is substantially in the shape of a C-clamp adapted to engage the end of an ironing board 12. Clamp 11 comprises the C-shaped portion 13 and the screw member 14 adapted to engage the under side of board 12 and grip the same between itself and the upper arm 15 of the C-clamp 11. Integral with upper arm 15 of clamp 11 is the standard 16. The upper end of the standard 16 is formed with a stud projection 16a, adapted to engage into a socket 16b formed in a removable standard 16c to rotatably mount the latter on the stud projection 16a. The removable standard 16c may be secured to any angularly set position by a set screw 16d. On this removable standard 16c is mounted the transverse tubular member 17, which may be formed integral therewith, as illustrated. Standards 18 are mounted internally of the tubular member 17 near the ends thereof and support the cylindrical bosses 19 extending coaxially with member 17.

Two substantially cylindrical spools 20 and 21 are mounted on tube 17, one on either side of standard 16 and are rotatable thereon. The spools 20 and 21 serve as take-up reels for the wall plug electric cord 22 and the smoothing iron electric cord 23, respectively. The rotation of each spool 20 and 21 on tube 17 is completely independent of its companion spool. Cords 22 and 23 are electrically interconnected by means well known in the art and similar in general construction to those shown in United States Patent 1,216,319 to Huling and will not be further described nor illustrated herein.

Cord 22 is a conventional two-prong plug 24 for insertion into wall socket 25 as a source of electric current. Cord 23 has a suitable connector 26 for engagement with electric smoothing iron 27 to be used in connection with the ironing board 12.

The spools 20 and 21 are provided at their outer ends with short arms 28 and 29 extending radially inward substantially from their peripheries to a point radially inside tube 17 and thence inwardly of tube 17, the inward extending portion 30 constituting anchors for coil springs 31 and 31ª whose inner ends are mounted on studs 19 of standards 18. Spring 31ª connected to spool 21 through arm 29 is similar in all respects to spring 31 illustrated, except that it is oppositely wound. Thus, cord 22, in being unreeled from spool 20, causes the same to revolve clockwise of Fig. 1 and thus to load spring 31, whereas cord 23, in being reeled off spool 21, causes the latter to revolve counter-clockwise of Fig. 1 and to load spring 31ª.

Guide arm collar 32 is a substantially cylindrical member freely rotatably mounted on tube 17 to the right of standard 16 in Fig. 2. Guide arm 33 is formed integrally with collar 32 and extends substantially radially outward therefrom, being substantially L-shaped, the free portion 34 extending parallel to spool 21 and longitudinally substantially coincident therewith and terminating in the eye 35. Cord 23 is led through eye 35 and is thereby supported at some distance from its spool 21, as clearly shown in Figs. 1 and 2.

The position of guide arm 33 relative to tube 17 and the reel 10 generally may be varied angularly, as clearly shown in Fig. 1, by rotation of collar 32 on tube 17, collar 32 being angularly fixable on tube 17 by means of the L-shaped handle 36. The latter comprises a threaded portion 37 threaded into collar 32 and engaging tube 17 with its flat inner end. In the full line position of Fig. 2, handle 36 has locked collar 32 and guide arm 33 relatively to tube 17. By counter-clockwise movement of handle 36 as indicated by the arrow A therein, collar 32 is free to rotate on tube 17 thereby permitting adjustment of guide arm 33.

The inner end face of spool 20 is provided with a plurality of longitudinally extending cylindrical recesses 38 in spaced relation and on the periphery thereof. Boss 39 on standard 16 mounts leaf spring 40 extending substantially parallel to the end surface of spool 20. A pin 41 mounted on leaf spring 40 so as to extend perpendicularly therefrom is engageable selectively into the recesses 38 as they come in angular coincidence therewith. In such position of engagement, spool 20 is locked against the rotation. Spool 20 may be freed for rotation by withdrawing pin 41 by flexing leaf spring 40 backwards, as shown in the broken line position of Fig. 2.

In operation, board 12 may be set at a convenient distance from the wall socket 25 and cord 22 may be reeled off spool 20 just sufficiently to reach socket 25, as shown in Fig. 1, and pin 41 may be allowed to engage the nearest recess 38 so as to lock spool 20 in position and prevent spring 31 from tensioning cord 22, which will extend loosely to socket 25 without either tension or undue looseness.

Iron 27 may now be used in convenient manner and guide arm 33 may be set into the position most convenient in view of the type of work being done at the time.

The upper arm 15 of the clamp portion 11 is provided with an integral side extension 15ª formed with an inclined surface 15ᵇ adapted to support the electric iron 27 in an inclined position as shown in Fig. 2.

The device may be attached to a wall or other surface 40 by screws or the like 41 which may pass through openings formed in the flange 42 of the removable standard 16ᶜ.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a wire connector for ironing boards, in combination, a standard, means for attaching said standard to an ironing board, a removable standard rotatably attached to the first standard and a tubular member extending transversely to both sides of said second standard, spools for electrically conductive cords rotatably mounted on said member on each side of said standard, a spring operatively connected to one of said spools so as to be loaded upon rotation of said spool in a given direction, a spring operatively connected to the other of said spools so as to be loaded upon rotation of said other spool in the opposite direction, standards located within said tubular member and bosses mounted on said last mentioned standards coaxially with said tubular member, said springs further being connected to said bosses.

2. In a wire connector for ironing boards, in combination, a standard, means for attaching said standard to an ironing board, a removable standard rotatably attached to the first standard and a tubular member extending transversely to both sides of said second standard, spools for electrically conductive cords rotatably mounted on said member on each side of said standard, a spring operatively connected to one of said spools so as to be loaded upon rotation of said spool in a given direction, a spring operatively connected to the other of said spools so as to be loaded upon rotation of said other spool in the opposite direction, standards located within said tubular member and bosses mounted on said last mentioned standards coaxially with said tubular member, said springs further being connected to said bosses, one of said spools being formed with recesses in its inner end surface, and means resiliently mounted on said standard for selectively engaging and disengaging said recesses for locking said spool against rotation relative to said member.

3. In a wire connector for ironing boards, a standard for attachment to the ironing board, tubular members extended laterally from each side of said standard, spools for electrically conductive cords rotatively mounted on said tubular members, standards formed on the ends of said tubular members and extended radially inward of said tubular members and having their free ends at the centers of said tubular members, bosses on the free ends of said latter-mentioned standards and extended coaxially into said tubular members, arms formed on the ends of said spools adjacent the ends of said tubular members and having portions extended eccentrically into the adjacent ends of said tubular members, and springs operating between said bosses and the portions of said arms for retaining said spools in positions in which the electrically conductive cords will be wound on said spools.

4. In a wire connector for ironing boards, a standard for attachment to the ironing board, a tubular member extending from one side of said standard, a spool for an electrically conductive cord rotatively mounted on said tubular member, resilient means for retaining said spool in a rotative position in which the cord is wound on the spool, said spool being formed with spaced recesses in its end adjacent said standard, a boss extending from said standard, and means on said boss selectively engageable with aid recesses for holding said spool in a desired rotative position in which the cord will be partially unwound from said spool.

5. In a wire connector for ironing boards, a standard for attachment to the ironing board, tubular members extending from diametrically opposite sides of said standard, a spool rotatively mounted on one of said tubular members and coextensive therewith for an electrically conductive cord to be attached to a source of electrical energy, a spool rotatively mounted on the other of said tubular members for an electrically conductive cord to be attached to an ironing implement, means within said tubular members and having connection with said spools at the outer ends of said tubular members for holding said spools in a rotative position in which the cords will be wound on the spools, and means engageable with the spool carrying the cord for attachment with the source of electrical energy for holding that spool in a rotative position against the action of said first means in which said cord will be partially unwound from its respective spool.

6. In a wire connector for ironing boards, a standard for attachment to the ironing board, tubular members extending from diametrically opposite sides of said standard, a spool rotatively mounted on one of said tubular members and coextensive therewith for an electrically conductive cord to be attached to a source of electrical energy, a spool rotatively mounted on the other of said tubular members for an electrically conductive cord to be attached to an ironing implement, an arm having a collar turnably engaged on the tubular member having the spool upon which the cord to be attached to the ironing implement is wound, said collar being rotative on said tubular member between said standard and the adjacent end of the respective spool, said arm having a portion overhanging said latter-mentioned spool and formed with an eye through which the cord to the ironing implement passes, and a handle threadedly engaged through said collar to be tightened against the tubular member which rotatively supports the collar for holding said arm in a desired angular turned position relative to said tubular member.

IRVING MENDELSOHN.

REFERENCES CITED

The following references are of record in the file of this patent:

UNITED STATES PATENTS

| Number | Name | Date |
|---|---|---|
| 142,188 | Atkinson | Aug. 26, 1873 |
| 1,675,140 | Schenderlein | June 26, 1928 |
| 1,872,528 | Temple | Aug. 16, 1932 |
| 1,888,258 | Bettinger | Nov. 22, 1932 |
| 1,914,654 | Tornblom | June 20, 1933 |
| 2,013,733 | Murphy | Sept. 10, 1935 |
| 2,174,828 | Latocha | Oct. 3, 1939 |

FOREIGN PATENTS

| Number | Country | Date |
|---|---|---|
| 198,109 | Switzerland | Aug. 16, 1938 |